United States Patent
Nussinovitch et al.

(10) Patent No.: US 11,835,995 B2
(45) Date of Patent: Dec. 5, 2023

(54) AUTOMATIC UNSTRUCTURED KNOWLEDGE CASCADE VISUAL SEARCH

(71) Applicant: Clarifai, Inc., Wilmington, DE (US)

(72) Inventors: Eran Nussinovitch, New York, NY (US); Michael Gormish, Wilmington, DE (US)

(73) Assignee: Clarifai, Inc., Wilmington, DE (US)

( * ) Notice: Subject to any disclaimer, the term of this patent is extended or adjusted under 35 U.S.C. 154(b) by 0 days.

(21) Appl. No.: 17/668,727

(22) Filed: Feb. 10, 2022

(65) Prior Publication Data

US 2023/0252059 A1    Aug. 10, 2023

(51) Int. Cl.
*G06F 16/33* (2019.01)
*G06F 16/338* (2019.01)

(52) U.S. Cl.
CPC .......... *G06F 16/334* (2019.01); *G06F 16/338* (2019.01)

(58) Field of Classification Search
CPC ...... G06F 16/334; G06F 16/338; G06F 16/53; G06F 16/532; G06N 20/00
See application file for complete search history.

(56) References Cited

U.S. PATENT DOCUMENTS

| | | | |
|---|---|---|---|
| 9,875,258 B1 * | 1/2018 | Hsiao | G06F 16/5846 |
| 10,222,942 B1 * | 3/2019 | Zeiler | G06N 5/022 |
| 10,503,775 B1 | 12/2019 | Ranzinger et al. | |
| 11,030,492 B2 * | 6/2021 | Zeiler | G06F 18/2431 |
| 2012/0109993 A1 | 5/2012 | Reznik | |
| 2014/0164406 A1 | 6/2014 | Petrou | |
| 2014/0201200 A1 * | 7/2014 | Li | G06V 10/761 707/723 |
| 2015/0161176 A1 * | 6/2015 | Majkowska | G06F 16/532 707/723 |
| 2015/0317389 A1 * | 11/2015 | Hua | G06F 16/334 707/738 |
| 2016/0078057 A1 * | 3/2016 | Perez de la Coba | G06F 16/5838 707/772 |
| 2016/0196350 A1 * | 7/2016 | Mau | G06F 16/951 707/706 |
| 2018/0210898 A1 | 7/2018 | Li et al. | |
| 2019/0147305 A1 * | 5/2019 | Lu | G06F 18/2413 382/157 |
| 2020/0380027 A1 | 12/2020 | Aggarwal et al. | |
| 2021/0004589 A1 | 1/2021 | Turkelson et al. | |

FOREIGN PATENT DOCUMENTS

| | | | |
|---|---|---|---|
| CN | 106462807 | * 2/2019 | G06F 16/35 |
| CN | 112784087 A | 5/2021 | |

OTHER PUBLICATIONS

International Search Report and Written Opinion dated Jul. 31, 2023 which was issued in connection with PCT Application No. PCT/US23/12771.

Cai et. al: "Hierarchical Clustering of WWW Image Search Results Using Visual Textual and Link Information" Multimedia '04:Proceedings of the 12th annual ACM International conference on Multimedia; Oct. 2004; pp. 952-959; https://doi.org/10.1145/1027527.1027747; Published: Oct. 10, 2004; retrieved on (May 27, 2023); retrieved from the internet <URL: https://dl.acm.org/doi/pdf/10.1145/1027527.

* cited by examiner

*Primary Examiner* — William Spieler
(74) *Attorney, Agent, or Firm* — Buckley, Maschoff & Talwalkar LLC

(57) ABSTRACT

Systems, methods and computer program code are provided to perform visual searches.

27 Claims, 6 Drawing Sheets

AUTOMATIC UNSTRUCTURED KNOWLEDGE CASCADE VISUAL SEARCH

BACKGROUND

Visual searches are searches performed by providing an input image to return matches of visually similar images from sets of data. Visual searches are used in product exploration or recommendations, face recognition, "snap and search" mobile applications (where a user captures an image of an object with a phone or similar device and search might be automatically initiated). Visual search can be used to retrieve information about a main item in the image, to find visually similar images, or the like.

As an illustrative example, a user may have an image of a particular shoe and may wish to search for shoes with a similar style. Unfortunately, getting accurate results in such searches can be difficult. For example, relevant images may be from different domains (often associated with the background the main object is surrounded by in the image). As a specific example, shoe images from a domain of catalog images may be centered on a white background, while shoe images from a domain of real-life (e.g., such as pictures of people wearing the shoes) may have a wide variety of backgrounds and environments. It can be difficult to create and train machine learning models that can accurately and quickly identify visually similar images across different domains in a way which is explainable and repeatable. Changes in domain can lead to search results that appear non-sensical to a user. For example, an image of a shoe might be matched to an image of a dog if both were photographed on the same carpet. Some visual search methods might indicate portions of the neural network, or portions of an image, that we responsible for a match, but without any explanation of the underlying category of data.

It would be desirable to provide visual search systems and methods that accurately return similar images quickly and across different domains. It would further be desirable to provide such searches in a way which is explainable and repeatable.

SUMMARY

According to some embodiments, systems, methods and computer program code to perform visual searches are provided. Pursuant to some embodiments, an input is identified and processed using a model to generate at least a first prediction that represents a first predicted cluster in which the input may be grouped and a representation of accuracy associated with the at least first prediction. A search of a datastore is initiated using the input and using an application associated with the first predicted cluster. A set of results is output where the results are predicted to be visually similar to the input.

Pursuant to some embodiments, the model may generate more than one prediction indicating that the input may be grouped in more than one cluster and searches may be initiated using applications associated with each of the clusters to obtain a set of results.

Pursuant to some embodiments, systems, methods and computer program code are provided to create a visual search application. Pursuant to some embodiments, a set of input data including a plurality of images is identified. The plurality of images are grouped in one or more clusters, and a search application component for each of the one or more clusters is created.

Pursuant to some embodiments, the plurality of images are processed using a predictive model (such as a general classifier model) and features from the plurality of images are extracted. In some embodiment grouping into clusters is performed at least in part on the extracted features.

In some embodiments, meta-data associated with each of the plurality of images is identified, and the grouping into clusters is based at least in part on the meta-data. In some embodiments, the meta-data includes classification or label information associated with each of the images.

A technical effect of some embodiments of the invention is an improved, accurate and efficient way of performing visual searches using a cascaded approach which provides greater explainability and predictable results. With these and other advantages and features that will become hereinafter apparent, a more complete understanding of the nature of the invention can be obtained by referring to the following detailed description and to the drawings appended hereto.

DETAILED DESCRIPTION

Users may wish to perform visual searches and receive one or more search results which are visually similar to an input. For example, a user may interact with an application that allows the user to upload an image (or take a picture) of an object and then perform searches to identify one or more visually similar objects. Embodiments described herein provide improved visual search systems and methods that provide improved explainability, speed of processing and accuracy of results. Pursuant to some embodiments, substantially automatic unstructured visual searches may be performed which return visually similar results. As used herein, the term "automated" or "automatic" may refer to, for example, actions that can be performed with little or no human intervention. Pursuant to some embodiments, the visual searches may be performed using a cascade search approach which will be described further herein.

Pursuant to some embodiments, visual search systems and methods are provided which leverage contextual knowledge from a general model and which automatically find and isolate visually similar groups. Pursuant to some embodiments a "cascade" approach is used in which learning tasks are combined in a cascading sequence (e.g., classification and then search). As will be described further herein, a first process (e.g., a preprocessing or training process) is performed to group training inputs into unique clusters and then to create individual visual search applications associated with those clusters. This processing will be described further below in conjunction with FIG. 2. The visual search process (e.g., an inferencing process) is then performed on request by a user (e.g., when a user interacts with a system of the present invention to perform a visual search) which invokes visual search applications created in the process of FIG. 2.

Figure 3:
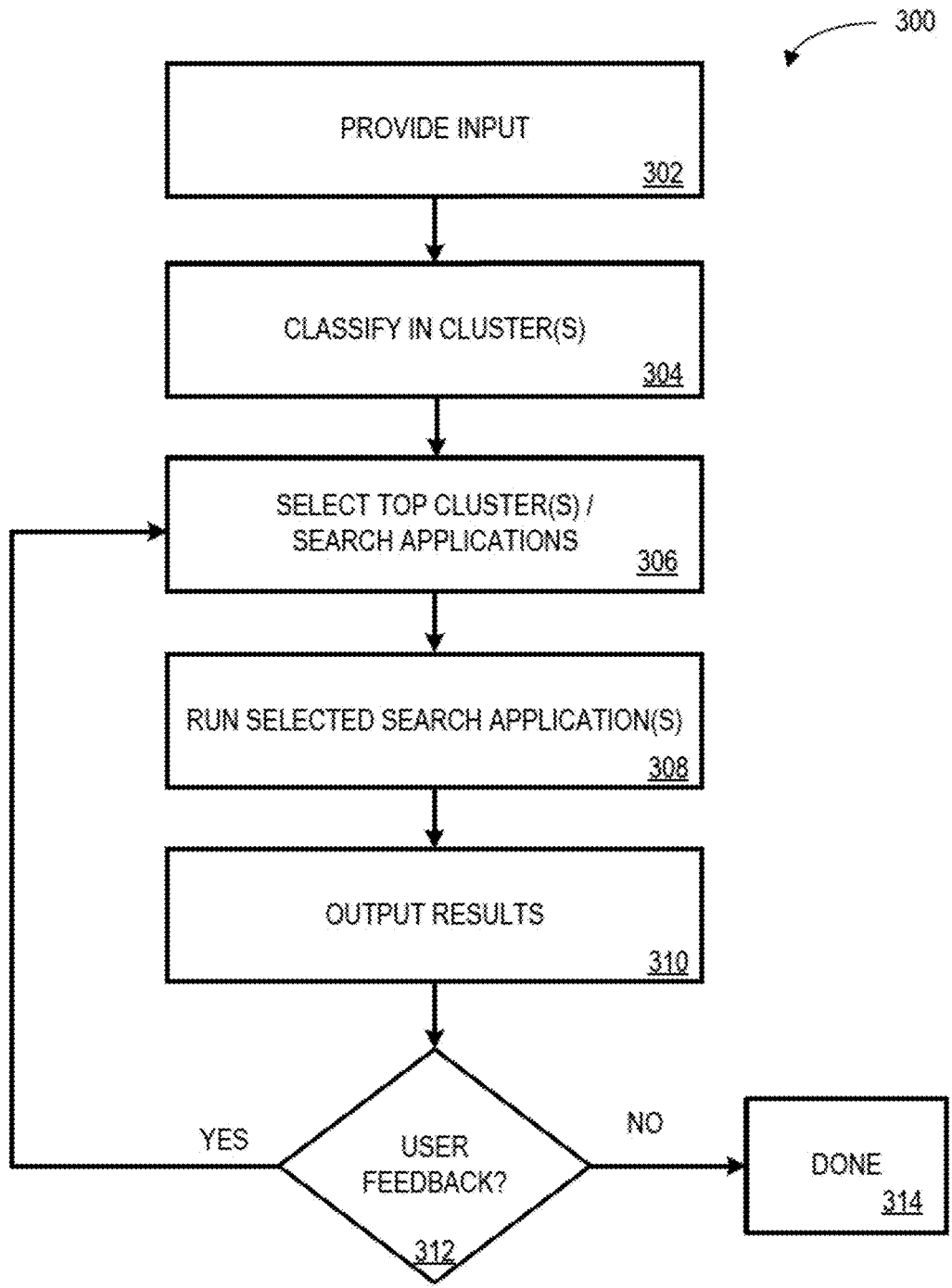
FIG. 3 illustrates a process pursuant to some embodiments.
Figure 4A:
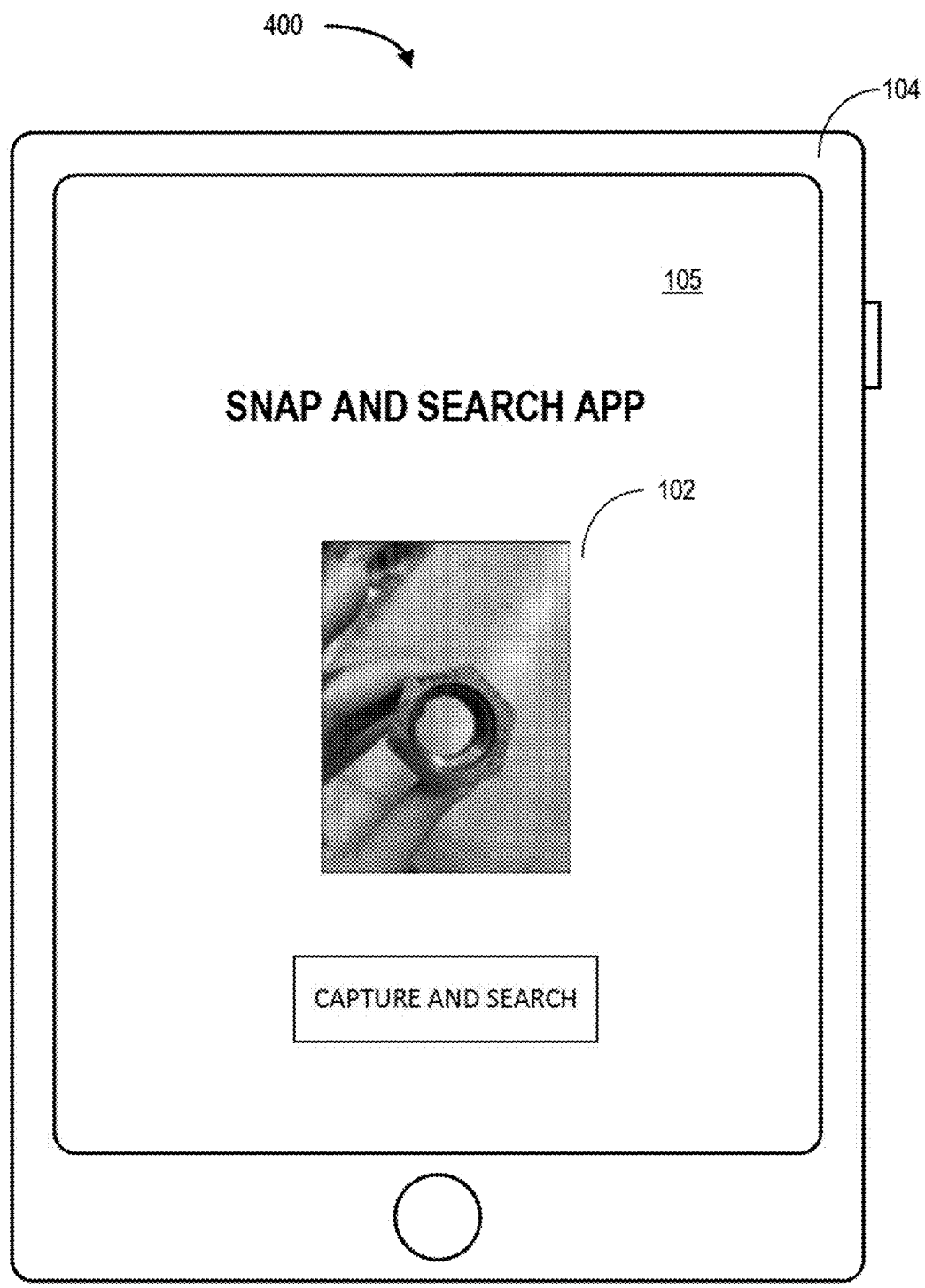
FIGS. 4A and 4B illustrate example user interfaces of a visual search application pursuant to some embodiments.

This visual search process is described in conjunction with FIG. 3 and further by reference to the example user interfaces of FIGS. 4A and B.

Embodiments of the present invention enable a higher level of explainability than other visual search techniques. This higher level of explainability is provided, at least in part, by breaking the difficult technical problem of visual search into smaller processes in a cascading fashion. Applicants have found that use of the cascade visual search features described herein provides a number of benefits including reduced processing time (e.g., with less human intervention) as well as improved accuracy.

Prior to describing these processes, features of some embodiments will now be described by first referring to FIG. 1 which is a block diagram of a system 100 according to some embodiments of the present invention. As shown, system 100 includes a visual search platform 122 which receives inputs 102 (such as images, videos or the like) and which produces outputs (e.g., such as image data 136). For example, the visual search platform 122 may be operated to allow a user to provide an image as an input 102 and receive one or more outputs (such as one or more images 136) which the visual search platform 122 indicates are visually similar to the input 102.

Pursuant to some embodiments, the system 100 includes components and interfaces that allow the performance of substantially automatic and unstructured visual searches. Pursuant to some embodiments, the system 100 may further include components and interfaces that allow the creation of one or more visual search modules 118 that may be used to conduct visual searches as described further herein. In some embodiments, the creation of the visual search modules 118 may be performed using a different system than the system used to conduct the visual searches. For example, one system may be used to perform the clustering and creation of visual search modules 118 (as described in the process shown in FIG. 2) and a different system may be used to perform the visual searches (as described in the process shown in FIG. 3). For convenience and ease of exposition, an illustrative (but not limiting) embodiment will be described herein in which the processing of FIGS. 2 and 3 may be performed using the same system (e.g., the system 100 of FIG. 1).

Pursuant to some embodiments, the model module 112 may include (or have access to) one or more "general" model (e.g., a classification model trained to predict a wide variety of different concepts in images or videos). The model(s) associated with the model module 112 may be configured to process inputs 102 and provide predictions, and one or more subsystems that are configured to process the input as well as output from the models. As an example, the visual search platform 122 may be configured to generate predictions associated with inputs 102 such as images or videos. For simplicity and ease of exposition, the term "image data" may be used herein to refer to both still images and videos. The predictions or outputs of the models may be used by a clustering module 116 to generate cluster data 134 as will be described further below in conjunction with the process description of FIG. 2.

For clarity and ease of exposition, the term "concept" is used herein to refer to a predicted output of a model. For example, in the context of a classification model, a "concept" may be a predicted classification of an input. Embodiments are not limited to use with models that produce "concepts" as outputs—instead, embodiments may be used with desirable results with other model output types that are stored or written to a memory for further processing. For convenience and ease of exposition, to illustrate features of some embodiments, the term "confidence score" is used to refer to an indication of a model's confidence of the accuracy of an output (such as a "concept" output from a model such as a classification model). The "confidence score" may be any indicator of a confidence or accuracy of an output from a model, and a "confidence score" is used herein as an example. In some embodiments, the confidence score is used as an input to one or more threshold models to determine further processing actions as will be described further herein.

According to some embodiments, an "automated" visual search platform 122 may receive one or more inputs 102 and perform processing to automatically produce one or more outputs of visually similar images as will be described further herein.

In some embodiments, a user device 104 may interact with the visual search platform 122 via a user interface (e.g., via a web browser) where the user interface is generated by the visual search platform 122 and more particularly by the user interface module 114. In some embodiments, the user device 104 may be configured with an application (not shown) which allows a user to interact with the visual search platform 122. In some embodiments, a user device 104 may interact with the visual search platform 122 via an application programming interface ("API") and more particularly via the interface module 120. For example, the visual search platform 122 (or other systems associated with the visual search platform 122) may provide one or more APIs for the submission of inputs 102 for processing by the visual search platform 122. As discussed above, for convenience and ease of exposition, the visual search platform 122 shown in FIG. 1 is one in which both the preprocessing or training processes (of FIG. 2) and the visual search processes (of FIG. 3) are described as being performed by the same platform 122. In other embodiments, the preprocessing or training may be performed on a different platform. In the embodiment depicted in FIG. 1, inputs 102 may be provided for different purposes (e.g., inputs 102 may be provided for training purposes when the platform 122 is operated in conjunction with FIG. 2 and inputs 102 may be provided to initiate a visual search when the platform 122 is operated in conjunction with FIG. 3).

Figure 4B:
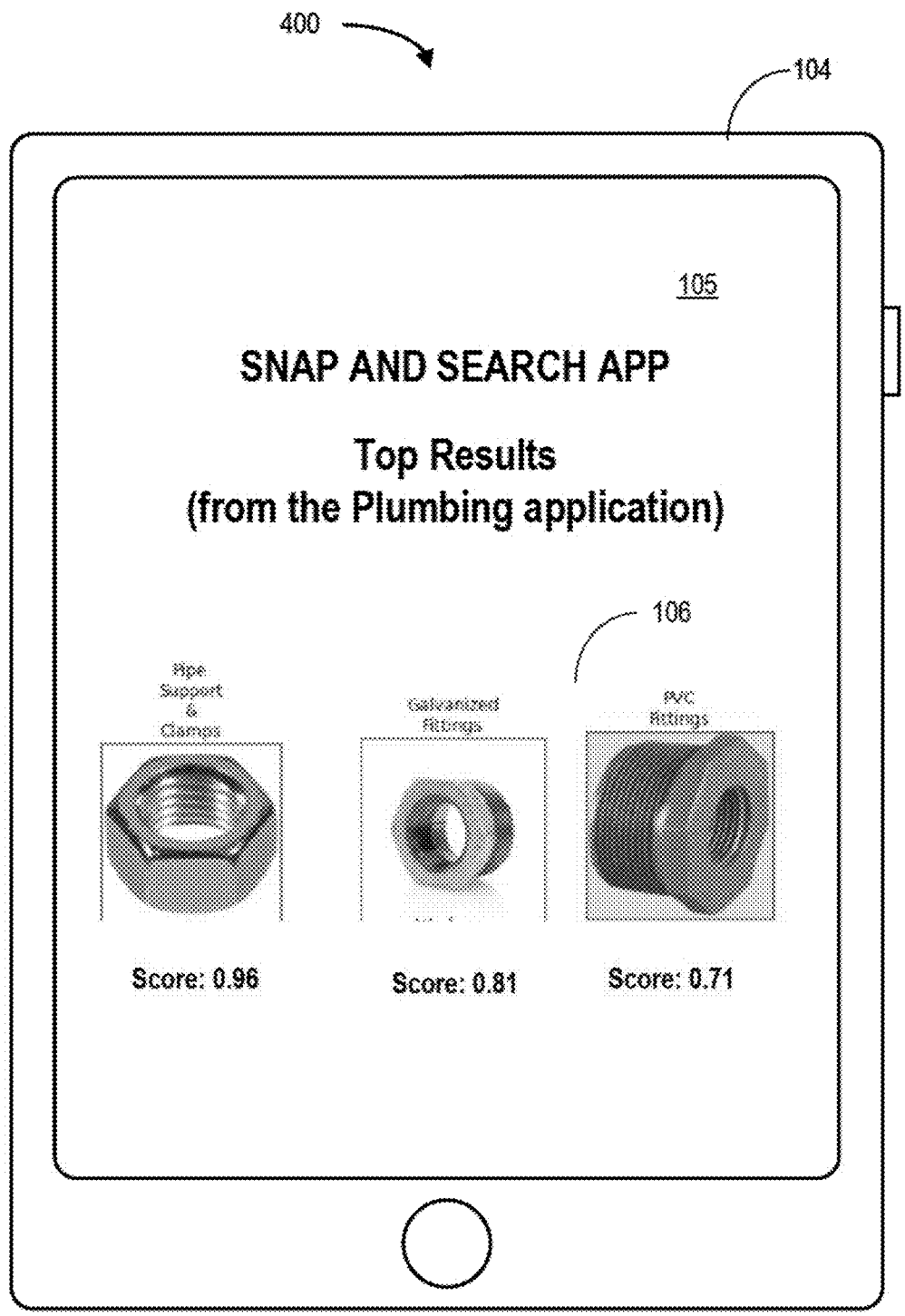

For the purpose of illustrating features of some embodiments, the use of a web browser interface will be described; however, those skilled in the art, upon reading the present disclosure, will appreciate that similar interactions may be achieved using an API. An illustrative (but not limiting) example of a web browser interface pursuant to some embodiments will be described further below in conjunction with FIG. 4.

The system 100 can include various types of computing devices. For example, the user device(s) 104 can be mobile devices (such as smart phones), tablet computers, laptop computer, desktop computer, or any other type of computing device that allows a user to interact with the visual search platform 122 as described herein. The visual search platform 122 can include one or more computing devices including those explained below with reference to FIG. 5. In some embodiments, the visual search platform 122 includes a number of server devices and/or applications running on one or more server devices. For example, the visual search platform 122 may include an application server, a communication server, a web-hosting server, or the like.

The devices of system 100 (including, for example, the user devices 104, inputs 102, visual search platform 122 and databases 132, 134 and 136) may communicate using any communication platforms and technologies suitable for transporting data and/or communication signals, including any known communication technologies, devices, media, and protocols supportive of data communications. For example, the devices of system 100 may exchange information via any wired or wireless communication network such as the Internet, an intranet, or an extranet. Note that any devices described herein may communicate via one or more such communication networks.

Figure 1:
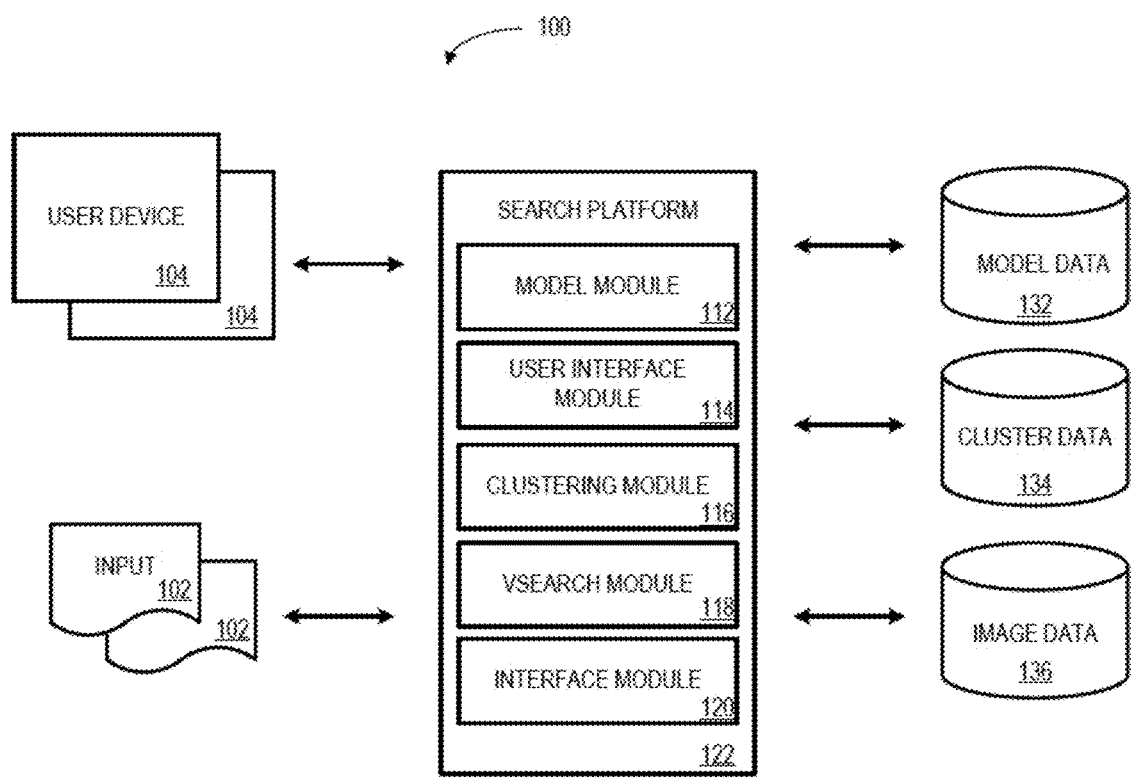
FIG. 1 is block diagram of a system pursuant to some embodiments.

Although a single visual search platform 122 is shown in FIG. 1, any number of such devices may be included. Moreover, various devices described herein might be combined according to embodiments of the present invention. For example, in some embodiments, the visual search platform 122 and cluster database 134 (or other databases) might be co-located and/or may comprise a single apparatus.

Once the visual search platform 122 has been trained and operated to create one or more visual search applications, the platform 122 can be operated to perform efficient and accurate visual searches. Prior to a discussion of a training process in conjunction with FIG. 2, a brief illustrative (but not limiting) example will first be introduced. In the illustrative example, an organization wishes to provide access to an efficient and accurate visual search application to users (e.g., such as users operating user devices 104). The organization chooses to use features of the present invention to provide such a search application and has access to a well-trained "general" classification model (e.g., via model module 112). The organization first performs preprocessing to create one or more visual search applications (as discussed in conjunction with FIG. 2). Then, those visual search applications are selected in response to visual search requests made by users (e.g., where the users submit inputs for use by the visual search platform 122 to retrieve one or more visually similar images to return to the user as visual search results). The users may interact with the visual search platform 122 via devices 104 such as mobile devices or the like. As a simple illustrative example, the user may operate a mobile device and may capture an input 102 using a camera of the mobile device. The input 102 is transmitted from the mobile device to the visual search platform 122 and the visual search platform 122 performs processing as described in conjunction with FIG. 3 to return one or more visual search results to the user device 104.

Figure 2:
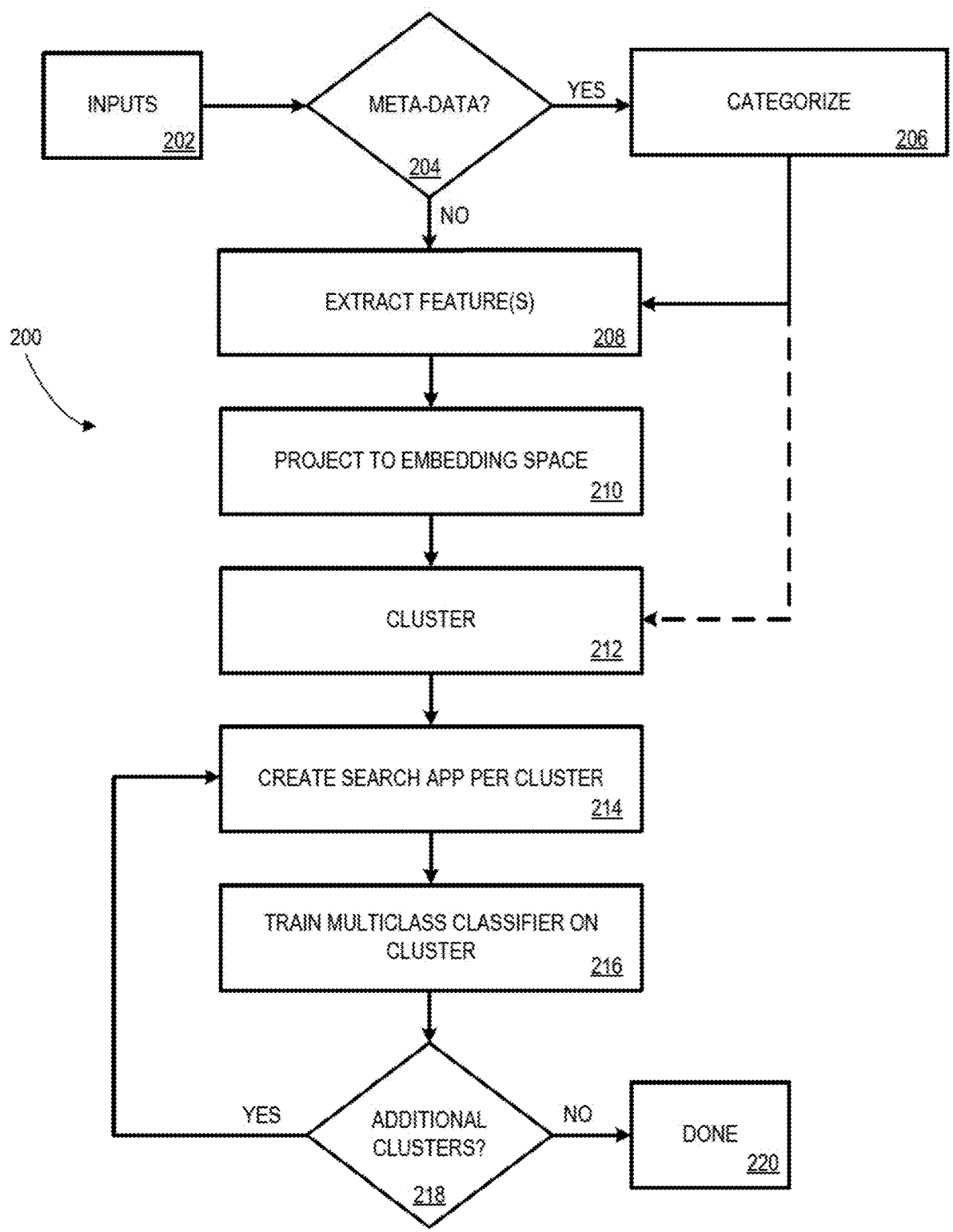
FIG. 2 illustrates a process pursuant to some embodiments.

Reference is now made to FIG. 2 where a preprocessing process 200 is shown that might be performed by some or all of the elements of the system 100 described with respect to FIG. 1 according to some embodiments of the present invention. The flow charts and process diagrams described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 200 of FIG. 2 depicts an embodiment which may be used to create one or more visual search applications. The process 200 of FIG. 2 may be performed via a user interface (e.g., by a user interacting with a user interface of a user device 104) or via an API associated with the visual search platform 122. Process 200 begins at 202 where one or more inputs 102 are provided to the platform 122 for use in creating one or more visual search applications. The inputs 102 may be provided in batches or individually. In some situations, some or all of the inputs 102 may include meta-data or other descriptive information associated with them which may be used to categorize or cluster the inputs into groups. For example, in an embodiment where the inputs 102 are from a catalog domain, some or all of the inputs 102 may be tagged, labeled or otherwise categorized. This information may be included in the input 102 (e.g., as attribute data of an image) or the information may be printed or displayed on the image (in which case some character recognition processing may be required to extract the meta-data). As an illustrative example, if the inputs 102 are from a home improvement store website, some or all of the inputs 102 may be labeled with categories in which the inputs 102 will be displayed in the website. For example, an image of a refrigerator may be tagged with categories such as "kitchen", "appliance", "refrigerator". This information, if present, may be used to categorize the inputs 102 at 206.

Once the inputs have been categorized (if meta-data were present), processing may continue at 208 where the inputs are processed using a predictive model (e.g., such as a neural network configured as a classification model) to extract feature(s) from the inputs 102. In some embodiments, the model may be a well-trained "general" model that may operate on the inputs and extract features from those inputs. Processing continues at 210 where those features are projected to an embedding space. For example, the model may generate embeddings, or mappings of discrete variables or categories to a vector of continuous numbers. Those skilled in the art will appreciate that a number of different types of neural networks may be used for such purposes and will appreciate the operation of such neural networks to project features of the inputs to an embedding space. For example, numerical representations of a predicted classifications of inputs may be projected in hyperspace based on some distance metric (such as euclidean distance) or some angle in hyperspace (e.g., such as cosine similarity) to allow clustering algorithm(s) to automatically create groups or clusters. Processing at steps 202-210 are repeated until all the inputs 102 have been processed and projected to an embedding space (and, if appropriate, where all the inputs 102 with meta-data have been categorized). In some embodiments, this may include providing a number of inputs 102 related to a common concept (e.g., such as a plurality of images of different types of shoes, or a plurality of images of different types of plumbing hardware, etc.).

In some embodiments, where the input data has sufficient meta-data, processing may proceed directly from 206 (where the inputs are categorized) to 212 where the categories are used to create clusters without operation of steps 208-210.

Pursuant to some embodiments, processing proceeds from 210 to 212 where the embeddings (and, if appropriate, the categorized inputs having meta-data) are then clustered in unique groups. For example, in some embodiments, processing at 212 may include clustering using a process such as a k-means clustering method (e.g., using the Python module from Scikit-learn or the like). Applicants have found that using clustering approach using a shoulder on top of a k-means cluster produces desirable results. The objective is to identify groups (or "clusters") of closely related data points in the embeddings. These closely related data points, in an image analysis context, represent images that are visually similar to each other. This clustering process may be an iterative process and may be repeated as additional inputs are added. Pursuant to some embodiments, a number of different clusters may be performed such that individual inputs may be associated with a cascade of clusters. For example, clusters may include more generic groupings (such as "appliances" or "kitchen") as well as more specific groupings (such as "refrigerators"). Those skilled in the art, upon reading the present disclosure, will appreciate that a number of different clustering or grouping approaches may be used so long as groups or clusters of related data points are identified.

Once the input data (or more accurately, the embeddings) are grouped into unique clusters (and, if appropriate, any categorized data from inputs having meta-data), processing continues at 214 where a search application is created for each cluster. In some embodiments, processing at 214 may or may not include some user input. For example, a user may be prompted to provide a name for each cluster (e.g., such as "tennis shoes" or "running shoes" for a specific cluster of shoes, or "plumbing fixtures" for a specific set of hardware for plumbing). User input may not be required, however, as the name or label may be automatically assigned to each cluster based on concepts predicted by the general model.

As each search application is created for each cluster, processing at 216 is also performed to train a multiclass classifier model on each cluster. For example, the inputs 102 associated with the embeddings in each cluster may be provided as inputs to a multiclass classifier model at 216. These inputs 102 are used to train the classifier to classify similar inputs for use by the associated search application. That is, the classifier is trained at 216 to identify visually similar images as those that created the cluster (and therefore those that created the search application at 214). Processing at 214 and 216 is repeated until each unique cluster has an associated search application and trained classifier.

The process 200 may be performed repeatedly to create a number of visual search applications. For example, in practical application, the process 200 may be repeated to create hundreds or tens of thousands of visual search applications. Each visual search application (and corresponding inputs in the cluster) will have been used to train one or more multiclass classifiers. In general, the classifiers have been trained to predict which visual search application(s) an input should be classified as. Further, in some embodiments, visual search applications may be cascaded such that more general search applications are operated first and then outputs from those general search applications are provided as inputs to more specific visual search applications. Applicant has found that such cascading provides desirable and accurate search results.

Reference is now made to FIG. 3 where a visual search process 300 is shown that might be performed by some or all of the elements of the system 100 described with respect to FIG. 1 according to some embodiments of the present invention. Pursuant to some embodiments, the visual search process 300 is performed after a plurality of visual search applications have been created and after a multiclass classifier has been trained as described in conjunction with FIG. 2.

The visual search process 300 will be described using the illustrative example introduced above and in which visual search applications have been created and where a multiclass classifier model has been trained. Further, the process 300 will be illustrated by reference to the user interfaces of FIGS. 4A-B. The visual search process 300 begins at 302 where an input is provided. For example, the input 102 may be an image captured by a user operating a user device 104 and transmitted to the visual search platform 122 of FIG. 1. As shown in FIG. 4A, the user device 104 is a mobile device with a display 105 that prompts the user to capture an image (e.g., using a camera of the mobile device) and submit the image as an input 102 for processing by the visual search platform 122. In the illustrative example shown in FIG. 4A, the user has captured an image of a nut or some other type of hardware fixture and the user wants to identify the input 102.

Processing continues at 304 where the visual search platform 122, upon receipt of the input 102, presents the input 102 to the multiclass classifier model for classification. The model performs processing to predict a classification of the input 102. In some embodiments, the model may generate one or more predicted "concepts" associated with the input 102. Each predicted concept may be associated with a confidence score that represents an indication of the model's confidence in the accuracy of a predicted concept. The classifier may, for example, predict several different classifications that are associated with several different visual search applications. Each of the predictions may have an associated confidence score. Processing continues at 306 where the top cluster(s)/search application(s) are selected. For example, referring to the example in FIG. 4A, the classifier may predict the following clusters/search apps based on the input 102: {plumbing: 0.98, appliances: 0.3, bathroom: 0.05, outdoors: 0.01}. That is, the classifier may indicate, with a confidence level of 0.98, that the input 102 is associated with a search application labeled "plumbing". In this example, the classifier indicates a high probability that the input is associated with the plumbing search application and not any other (the other search applications/clusters have low confidence scores). In this case, the visual search platform 122 may cause only a single visual search application to be executed (the "plumbing" visual search application). In other examples, several clusters/visual search applications may be identified with high confidence. In those situations, several visual search applications may be executed and the results aggregated for display to the user. Whether a single visual search application or multiple visual search applications are executed, the top images resulting from operation of those applications will be output to the user at 310. For example, referring to FIG. 4B, the user may be presented with a display 105 indicating the top results. In the example shown, three visually similar images are returned to the user with the predicted most similar image shown on the left. In the example shown, the user is also presented with information about the search result (including a label as well as the confidence score).

Pursuant to some embodiments, the user may be presented with information prompting some feedback at 312 regarding the displayed results. For example, if the user is performing a visual search using a picture of a shoe, the system of the present invention may return search results that includes "dress shoes" as well as "athletic shoes" (e.g., the input image may have caused the selection of two search applications—one associated with dress shoes and one associated with athletic shoes). Pursuant to some embodiments, the user may be prompted to select which of the applications is most responsive to the user's search intent. If the user provides such feedback indicating a preference, embodiments may continue processing at 306 where further search results from that selected application may be returned. This user feedback may be performed at multiple times (e.g., at different levels of a cascade of different search applications). In this manner, embodiments provide accurate results that most closely match a user's search intent while providing a high degree of explainability.

Figure 5:
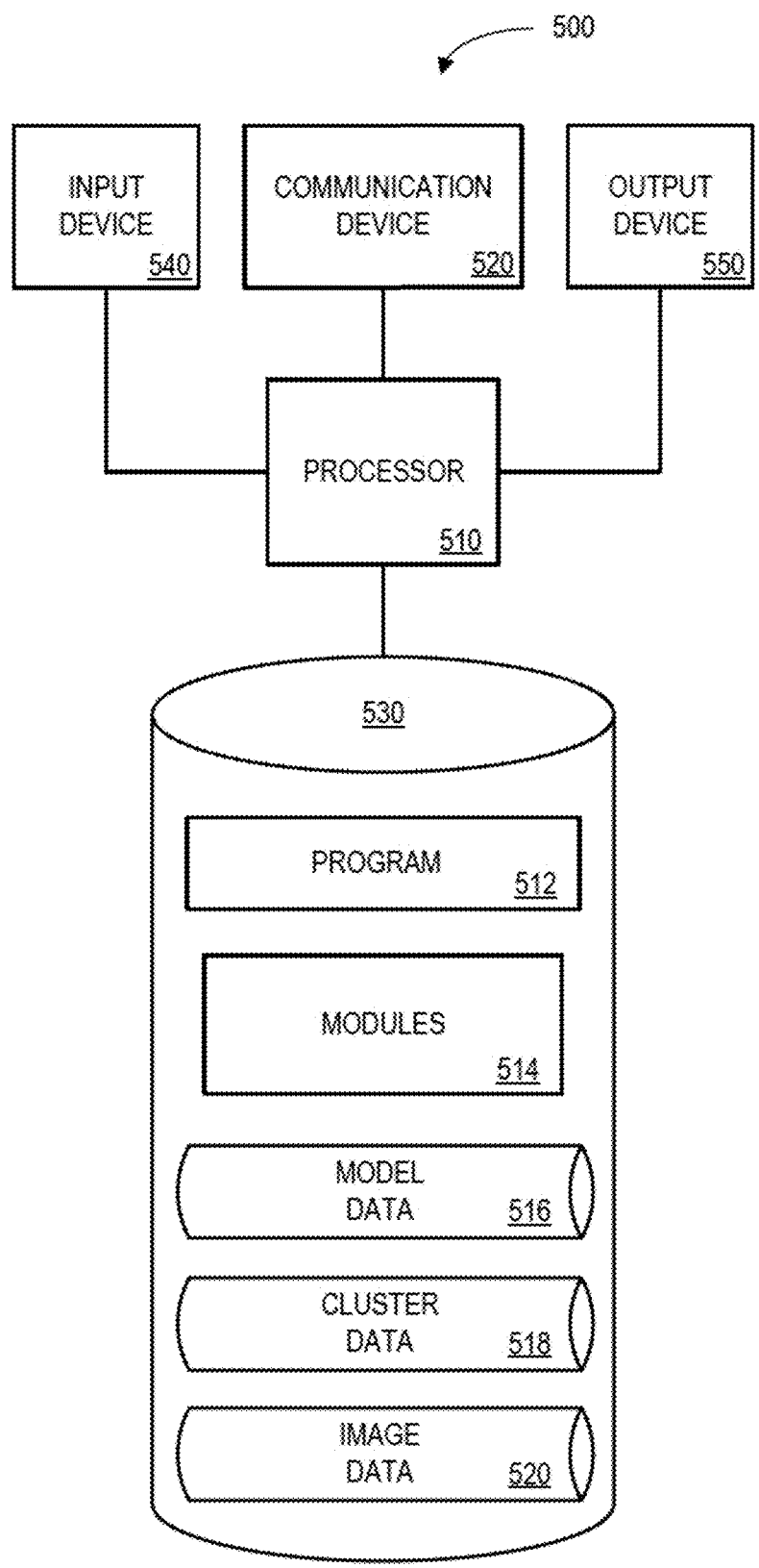
FIG. 5 is block diagram of a search platform pursuant to some embodiments.

Those skilled in the art, upon reading the present disclosure, will appreciate that the user interfaces of FIG. 4 are for illustrative purposes only and that a wide variety of different user interfaces may be used. Further, the embodiments described herein may be implemented using any number of different hardware configurations. For example, FIG. 5 illustrates a visual search platform 500 that may be, for example, associated with the system 100 of FIG. 1 as well as the other systems and components described herein. The visual search platform 500 comprises a processor 510, such as one or more commercially available central processing units (CPUs) in the form of microprocessors, coupled to a communication device 520 configured to communicate via a communication network (not shown in FIG. 5). The communication device 520 may be used to communicate, for example, with one or more input sources and/or user devices. The visual search platform 500 further includes an input device 540 (e.g., a mouse and/or keyboard to define rules and relationships) and an output device 550 (e.g., a computer monitor to display search results and other information to a user).

The processor 510 also communicates with a storage device 530. The storage device 530 may comprise any appropriate information storage device, including combinations of magnetic storage devices (e.g., a hard disk drive), optical storage devices, mobile telephones, and/or semiconductor memory devices. The storage device 530 stores a program 512 and/or one or more software modules 514 (e.g., associated with the user interface module, model module, clustering module, visual search module and interface module of FIG. 1) for controlling the processor 510. The processor 510 performs instructions of the programs 512, 514, and thereby operates in accordance with any of the embodiments described herein. For example, the processor 510 may receive input data and then perform processing on the input data such as described in conjunction with the process of FIGS. 2 and 3. The programs 512, 514 may access, update and otherwise interact with data such as model data 516, cluster data 518 and image data 520 as described herein.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

As used herein, information may be "received" by or "transmitted" to, for example: (i) the search platform 500 from another device; or (ii) a software application or module within the search platform 500 from another software application, module, or any other source.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. A computer implemented method to perform a visual search, the method comprising:
   receiving, by a search platform, information identifying an input image;
   processing, by the search platform, the input image using a model to generate at least a first prediction that represents a first predicted cluster from among a plurality of clusters in which the input image may be grouped and a representation of accuracy associated with the at least first prediction, wherein the representation of accuracy indicates the at least first predicted cluster has a high degree of relevance to the input image;
   automatically selecting, by the search platform, a visual search application that is relevant to the first predicted cluster, the visual search application selected from among a plurality of visual search applications;
   automatically initiating, by the search platform, a search of a datastore using the input image, the search performed using the selected visual search application; and
   outputting a set of image results predicted to be visually similar to the input image.

2. The computer implemented method of claim 1, wherein the model is a classification model.

3. The computer implemented method of claim 2, wherein the classification model is a multiclass classification model trained on a set of clusters.

4. The computer implemented method of claim 3, wherein the set of clusters are created by extracting features from a base model and clustering the features in unique groups.

5. The computer implemented method of claim 4, wherein the model is trained on the set of clusters.

6. The computer implemented method of claim 4, further comprising:
   generating, for each cluster in the set of clusters, a visual search application.

7. The computer implemented method of claim 1, wherein outputting a set of results further comprises:
   outputting a confidence score for each result in the set of results.

8. The computer implemented method of claim 7, wherein outputting a set of results further comprises:
   ranking each result in the set of results by the confidence score and presenting the result with the highest confidence score as the most similar result.

9. The computer implemented method of claim 1, further comprising:
   processing the input using a model to generate at least a second prediction that represents a second predicted cluster in which the input may be grouped, and a representation of accuracy associated with the at least second prediction.

10. The computer implemented method of claim 9, wherein initiating a search of a datastore using the input, the search performed using an application associated with the first predicted cluster further comprises:
    determining that the representation of accuracy associated with the at least first prediction is greater than the representation of accuracy associated with the at least second prediction.

11. The computer implemented method of claim 1, wherein each of the plurality of a visual search applications is created using a method comprising:

identifying a set of input data including a first plurality of images;

grouping the first plurality of images in one or more clusters; and creating a search application component for each of the one or more clusters.

12. The computer-implemented method of claim 11, further comprising:

processing the first plurality of images using a predictive model; and extracting features from the first plurality of images;

wherein the grouping is based at least in part on the extracted features.

13. The computer-implemented method of claim 12, wherein the predictive model is a base classifier model.

14. The computer-implemented method of claim 11, further comprising:

identifying meta-data associated with each of the first plurality of images;

wherein the grouping is based at least in part on the meta-data.

15. The computer-implemented method of claim 11, wherein the meta-data includes data identifying at least one of a category and a label.

16. The computer-implemented method of claim 11, wherein the meta-data includes data obtained by performing an optical character recognition process.

17. The computer-implemented method of claim 11, further comprising:

training a multiclass classifier model using each of the clusters.

18. The computer-implemented method of claim 17, wherein the multiclass classifier model is trained to classify an input as associated with at least one of the search application components.

19. The computer-implemented method of claim 11, further comprising:

deploying the visual search application for use in performing visual searches on inputs received from one or more remote user devices.

20. A system comprising:

an input device to receive an input image from a remote user device;

a processing unit; and a memory storage device including program code that when executed by the processing unit causes to the system to:

process the input image using a model to generate at least a first prediction that represents a first predicted cluster from among a plurality of clusters in which the input image may be grouped and a representation of accuracy associated with the at least first prediction, wherein the representation of accuracy indicates the at least first predicted cluster has a high degree of relevance to the input image;

automatically select a visual search application that is relevant to the first predicted cluster, the visual search application selected from among a plurality of visual search applications;

automatically initiate a search of a datastore using the input image, the search performed using the selected visual search application; and output a set of image results predicted to be visually similar to the input image.

21. The system of claim 20 wherein the model is a classification model.

22. The system of claim 21, wherein the classification model is a multiclass classification model trained on a set of clusters.

23. The system of claim 22, wherein the set of clusters are created by extracting features from a base model and clustering the features in unique groups.

24. The system of claim 23, wherein the model is trained on the set of clusters.

25. The system of claim 22, further including program code that when executed by the processing unit causes the system to:

generate, for each cluster in the set of clusters, a visual search application.

26. The system of claim 20, further including program code that when executed by the processing unit causes the system to:

generate at least a second prediction that represents a second predicted cluster in which the input may be grouped;

cause information to be displayed on the remote user device identifying the first predicted cluster and the second predicted cluster; and receive, from the remote user device, a selection of one of the first predicted cluster and the second predicted cluster as more accurately satisfying a user's search intent.

27. The system of claim 26, further including program code that when executed by the processing unit causes the system to:

initiate a search of the datastore using the input, the search performed using a visual search application associated with the selected one of the first predicted cluster and the second predicted cluster.

* * * * *